(12) United States Patent
Tran et al.

(10) Patent No.: US 11,320,638 B2
(45) Date of Patent: May 3, 2022

(54) CATADIOPTRIC SYSTEM FOR MID-WAVE THERMAL IMAGING EQUIPMENT

(71) Applicant: VIETTEL GROUP, Ha Noi (VN)

(72) Inventors: Tien Hai Tran, Ha Noi (VN); Quang Trung Trinh, Ha Noi (VN); Duy Nhat Tran, Vinh (VN)

(73) Assignee: VIETTEL GROUP, Ha Noi (VN)

( * ) Notice: Subject to any disclaimer, the term of this patent is extended or adjusted under 35 U.S.C. 154(b) by 359 days.

(21) Appl. No.: 16/553,645

(22) Filed: Aug. 28, 2019

(65) Prior Publication Data

US 2020/0073098 A1    Mar. 5, 2020

(30) Foreign Application Priority Data

Aug. 29, 2018   (VN) .............................. 1-2018- 03820

(51) Int. Cl.
  *G02B 17/08*   (2006.01)
  *G02B 13/14*   (2006.01)
(52) U.S. Cl.
  CPC ....... *G02B 17/0896* (2013.01); *G02B 13/146* (2013.01); *G02B 17/0856* (2013.01); *G02B 17/0884* (2013.01)
(58) Field of Classification Search
  CPC ............... G02B 17/08; G02B 17/0804; G02B 17/0808; G02B 17/0812; G02B 17/0856; G02B 17/0884; G02B 17/0886; G02B 17/0896; G02B 13/14; G02B 13/146

USPC ....... 359/359, 356, 357, 726, 727, 728, 729, 359/730, 731
See application file for complete search history.

(56) References Cited

U.S. PATENT DOCUMENTS

| | | | | |
|---|---|---|---|---|
| 4,453,800 A | * | 6/1984 | Fjeldsted | G02B 13/14 |
| | | | | 359/351 |
| 4,714,307 A | | 12/1987 | Palmer | |
| 5,802,335 A | | 9/1998 | Sturlesi et al. | |
| 10,298,817 B1 | * | 5/2019 | Schlupf | H04N 5/22521 |
| 2014/0002669 A1 | * | 1/2014 | Sudo | G02B 23/02 |
| | | | | 348/164 |

FOREIGN PATENT DOCUMENTS

CN      104965299 A  * 10/2015
RU      2292066 C1     1/2007

* cited by examiner

*Primary Examiner* — Marin Pichler
(74) *Attorney, Agent, or Firm* — PatentTM.US

(57) ABSTRACT

The invention proposed the catadioptric system, which consists of two main components: the first component comprising the two reflective mirrors, in which surface distortion of mirror 1 is parabolic, surface distortion of mirror 2 is aspheric; the second component is a relay consisting of three lenses: lens 1, lens 2, and lens 3 arranged after the medial image plane correspondingly; the second component helps reduce aberration to ensure receiving good quality image at a plane of the sensor.

2 Claims, 5 Drawing Sheets

CATADIOPTRIC SYSTEM FOR MID-WAVE THERMAL IMAGING EQUIPMENT

TECHNICAL FIELD

The invention relates to the field of optoelectronics and infrared engineering. Specifically, the invention proposes an infrared optical structure consisting of optical and spherical surfaces (Catadioptric) applied in mid-wave thermal imaging devices using infrared cooling sensors with aperture F #4 of cold shield.

BACKGROUND OF THE INVENTION

In the published patent documents, some works have content concerning catadioptric design for infrared radiation of the mid-wave range. Some shortcomings and limitations of the published inventions remain as follows:

U.S. Pat. No. 4,714,307 issued Dec. 22, 1987 describes the catadioptric system for the bipolar infrared band. In the patent, the author presents design using the Cassegrain optical system, which has one element of reflecting lens (Mangin) for mirror No. 2 to optimize the image quality at a sensor plane. The advantage of the described invention is using three common infrared materials (Ge, ZnS, ZnSe), the surfaces are traditional spheres not using aspherical so it is easy to fabricate. However, the disadvantage of the invention is the use of many optical elements that lead to difficulties in assembly and deployment. Besides, many optical elements increase the level of signal attenuation when passing through the optical system and increase the error of equipment assembly.

Russian Federation Patent No. 2292066 C 1 Jan. 20, 2007 volume 2 of describes the catadioptric system with 2 viewing fields for infrared band having a focal length of 180 mm/225 mm. The advantage of the invention is that the optical system of 2 viewing fields facilitates in the deployment of equipment, curved surfaces of the optical element are all spheres that are easy to fabricate. However, the disadvantage of the invention is that the quality of the optical system is not high, the design cannot be used for cooling sensors with cold shield.

U.S. Pat. No. 5,802,335 issued on Sep. 1, 1998 describes a catadioptric system used for cooling sensors. The description refers to the acquisition of full image at the sensor plane through the relay system from the medial image plane. The authors concentrates on the advantages of the invention with the control of the medial image plane and the matching of the pupil with the cold shield. However, the authors do not mention the parameters as well as the quality of the optical system image.

In order to overcome these limitations, the present invention proposes a catadioptric system for a medium wave radiation range with compact size giving high-quality images that are compatible with sensor size of 10 μm resolution (pixel) and HD resolution.

BRIEF SUMMARY OF THE INVENTION

The purpose of the invention is to propose a catadioptric system design for a mid-wave infrared radiation band that works well with a modern cooling thermal image sensor with a resolution of 10 μm pixel and HD resolution. Accordingly, the optical system can achieve high quality image at the sensor plane.

To achieve the above goal, the catadioptric system consists of two main components: the first one consists of mirrors 1 (1) and mirrors 2 (2) made of aluminum, reflects signal from infinity and creates medial image before the relay; the second is the relay consisting of three lenses: 1 (3) lens, 2 (4) lens, 3 lens (5). Lens 1 (3) and lens 3 (5) are made of silicon (Si), lens 2 (4) is made of magnesium fluoride ($MgF_2$), which helps reduce aberration to ensure good quality images at a plane of the sensor.

DETAILED DESCRIPTION OF THE INVENTION

Figure 1:
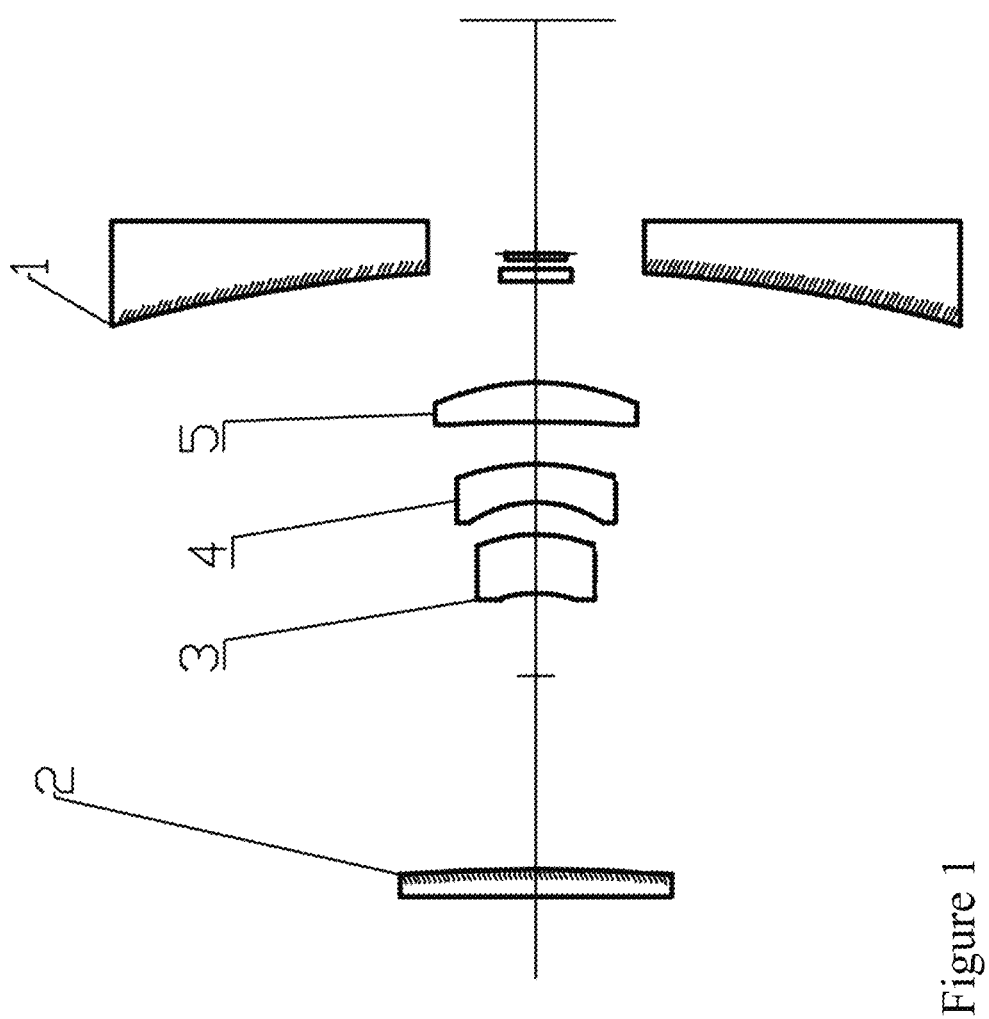
FIG. 1: Structure and symbol of elements of optical system stated in the invention.

In FIG. 1: The figure illustrates the main structures of the optical system proposed in this invention. The optical system consists of two main components:

The first one consists of mirrors 1 (1) and mirror 2 (2) arranged so that the two reflective surfaces are facing each other, in which the mirror 1 (1) is positioned farther from the external environment than the mirror 2 (2). Mirror 1 (1) and mirror 2 (2) have smooth surfaces that meet reflection coefficient greater than or equal to 99%, in which surface distortion of mirror 1 (1) is parabolic, surface distortion of mirror 2 (2) is aspheric. Materials for mirror manufacturing can be chosen freely, but the best result is aluminum. The details of the first component's structure are as follows:

Mirror surface 1 (1) satisfies:

$$Z(y) = \frac{y^2}{R \cdot \left[1 + \sqrt{1 - (1+K) \cdot \frac{y^2}{R^2}}\right]} \quad (1)$$

Where: K=−1 is Conic coefficient;
R=−132.74 is the radius of top of the mirror surface.
Mirror surface 2 (2) satisfies:

$$Z(y) = \frac{y^2}{R \cdot \left[1 + \sqrt{1 - \frac{y^2}{R^2}}\right]} + A_4 \cdot y^4 + A_6 \cdot y^6 + A_8 \cdot y^8 \quad (2)$$

Where R=−134.9 is the radius of top of the mirror surface; $A_4=3.129 \cdot 10^{-6}$; $A_6=-4.25 \cdot 10^{-9}$; $A_8=6.167 \cdot 10^{-12}$ are surficial coefficients.

The first component receives the signal in infrared radiation form from infinity, after two times reflections creates the real image at the medial image plane with the shading rate of the mirror 2 (2) to mirror 1 (1) being:

$$\frac{D_2}{D_1} = \frac{20.5}{68} = 0.3 \quad (3)$$

With the ratio above, the signal level remaining after the loss is:

$$\tau = 1 - \left(\frac{D2}{D1}\right)^2 = 1 - 0.3^2 = 0.91 = 91\% \quad (4)$$

With linear dependence of position, the size of the medial image plane relating to the radius and distance between mirror 1 (1) and mirror 2 (2), the radius of the two reflective mirrors and the distance between two mirrors are designed to ensure light rays convergence at the medial image plane. Therefore, it will ensure receiving the real image in the medial image plane.

The second component is a relay consisting of three lenses: lens 1(3), lens 2(4), lens 3(5) are arranged after the medial image plane correspondingly. To adjust the pupil matching the position and size with the cold shield, the optical system is designed to optimize the position of the relay to ensure meeting target of the sensor, while also to eliminate the aberration to ensure receiving good quality image.

In particular:

Lens 1 (3): has a meniscus shape made of silicon (Si), covered with anti-reflective coating with transmission greater than or equal to 99%. The lens contains one spherical surface and one aspheric surface, in which the concave spherical surface has a radius $R_3=9.954$ and the aspheric has a surface satisfying:

$$Z(y) = \frac{y^2}{R \cdot \left[1 + \sqrt{1 - \frac{y^2}{R^2}}\right]} + A_4 \cdot y^4 + A_6 \cdot y^6 + A_8 \cdot y^8 \quad (5)$$

Where R=−11.96 is the radius of top of the aspheric surface;
$A_4=9.925 \cdot 10^{-5}$; $A_6=1.152 \cdot 10^{-6}$; $A_8=4.829 \cdot 10^{-8}$ are surficial coefficients.

Lens 2 (4): has a meniscus shape made of magnesium fluoride ($MgF_2$), covered with anti-reflective coating with transmission greater than or equal to 99%. The lens contains two spherical surfaces: one concave spherical surface has a radius R=−9,954 and one convex spherical surface has a radius R=−19.4.

Lens 3 (5): has a meniscus shape made of silicon (Si), covered with anti-reflective coating with transmission greater than or equal to 99%. The lens contains one spherical surface and one aspheric surface, in which one concave spherical surface has a radius R=−20.96 and one aspheric has a surface satisfying:

$$Z(y) = \frac{y^2}{R \cdot \left[1 + \sqrt{1 - \frac{y^2}{R^2}}\right]} + A_4 \cdot y^4 + A_6 \cdot y^6 + A_8 \cdot y^8 \quad (6)$$

Where R=−208 is the radius of top of the aspheric surface;
$A_4=-5.051 \cdot 10^{-5}$; $A_6=2.116 \cdot 10^{-7}$; $A_8=-6.21 \cdot 10^{-10}$ are surficial coefficients.

Figure 5:
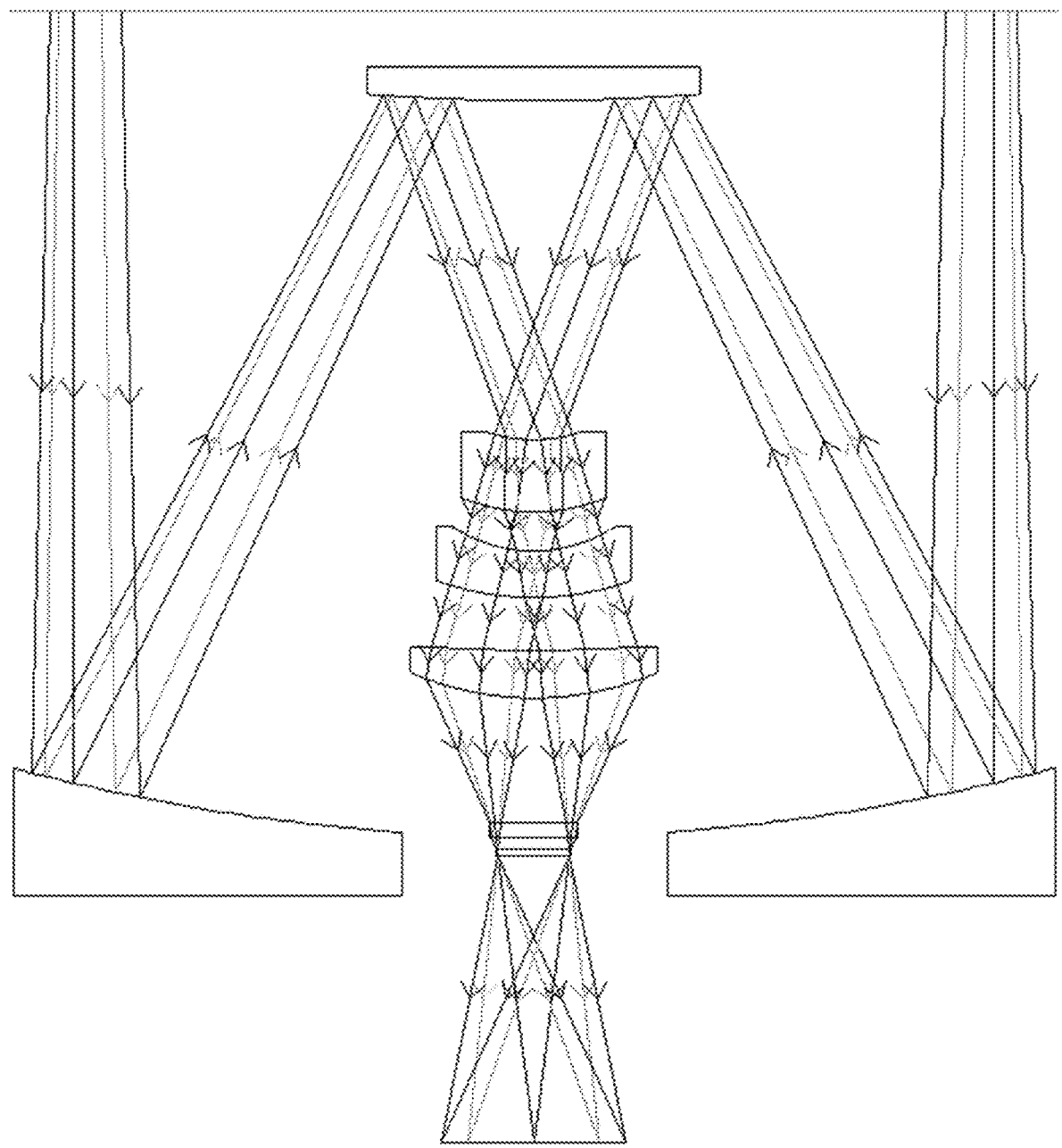
FIG. 5: Diagram of the rays of light when passing through the optical system.

In FIG. 5, the light ray path for the optical system after designing is as follows: Mirror 1 (1) is the surface receiving the signal from the infinite infrared radiation at first in the optical system. That signal will then reflect to mirror 2 (2), which will continue to be reflected to create a real image in the medial image plane. The signal after creating real image is refracted one by one through lens 1 (3), lens 2 (4), lens 3 (5) then through the cold shield and converges to create image at the sensor plane.

According to the proposed design, high quality image can be obtained at the sensor plane. The characteristics of the system are optimally calculated to control the position and size of medial images before the relay system creates image at the sensor plane. Due to the structure of the cooling sensors consisting of cold shield, it is also designed and optimized for the pupil to match the position and size with this window.

By using two reflectors and controlling the position of medial image plane, the optical system with the most optimal performance when having a total length of 78.7 mm, operates in the spectral band 3-5 μm; the focal length is 250 mm; 1:4 aperture and viewing field 1.6×2.2 degrees. Specifically, the detailed structure parameters of the device are shown in the following table:

TABLE 1

Parameters and detailed structures of the optical system

| Radius of curvature | Axial thickness | Material | Diameter of light beam |
|---|---|---|---|
| −132.74 | −49.93 | Al | 68 |
| −134.90(*) | 22.98 | Al | 20.5 |
| −9.954 | 4.9 | Si | 5.3 |
| −11.96(*) | 2.666 | | 8.1 |
| −9.954 | 3.15 | $MgF_2$ | 11.3 |
| −19.4 | 3.545 | | 14 |
| −208(*) | 3.26 | Si | 6 |
| −20.96 | 8.429 | | 5.9 |

Note:
(*)are aspheric surfaces.

Figure 2:
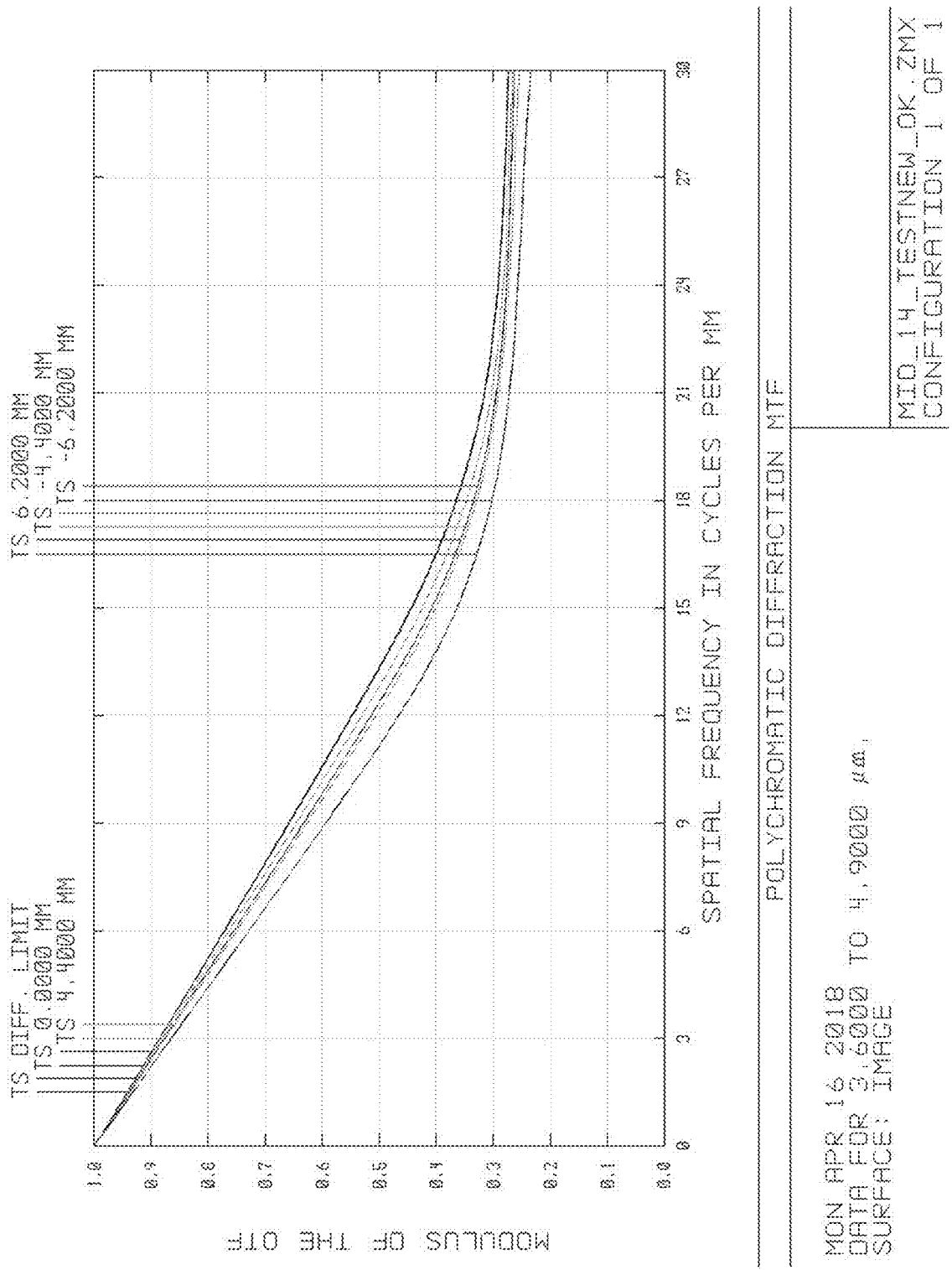
FIG. 2: Graph of MTF (Module Transfer Function)
Figure 3:
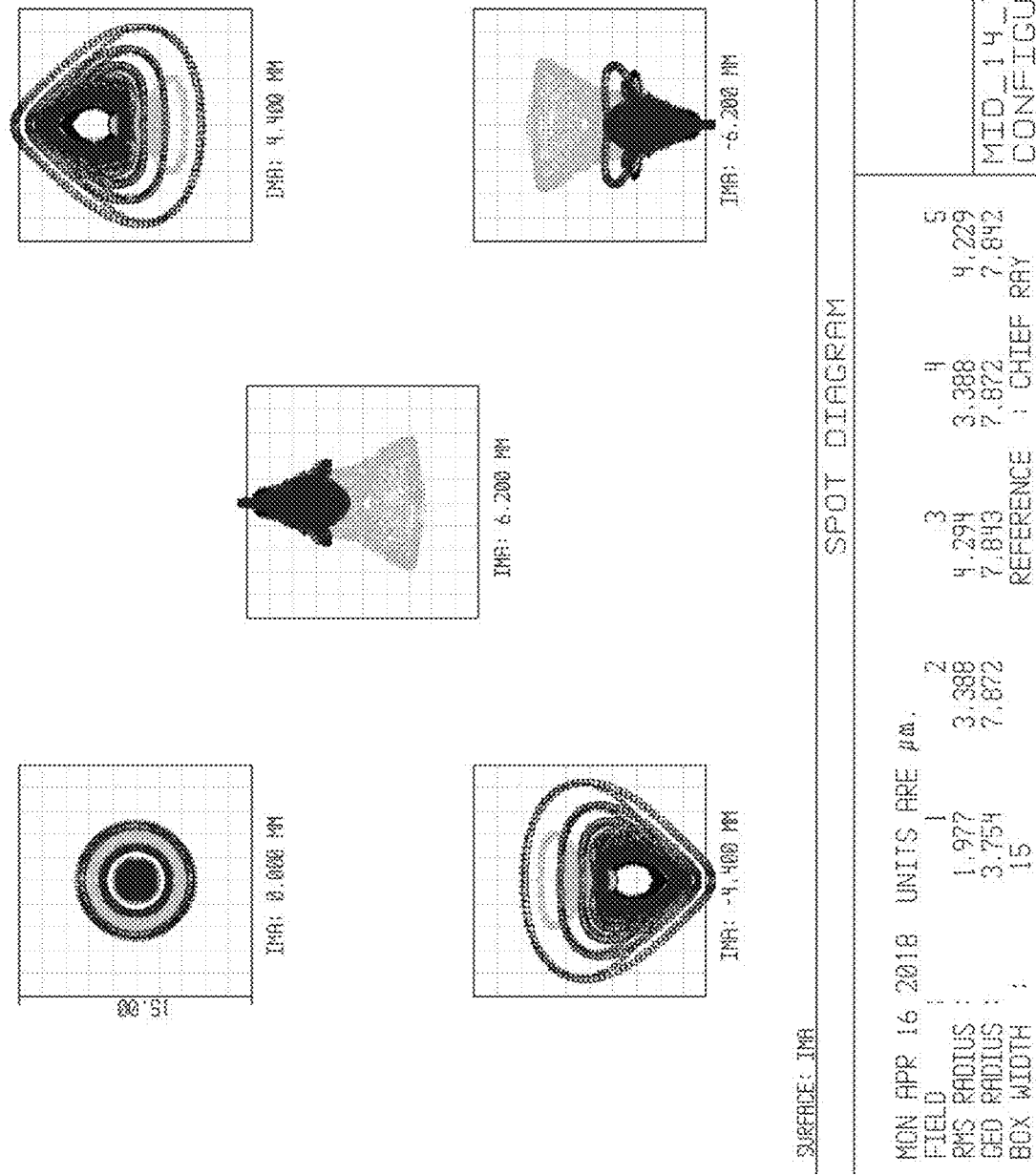
FIG. 3: Spot size at three viewing fields.
Figure 4:
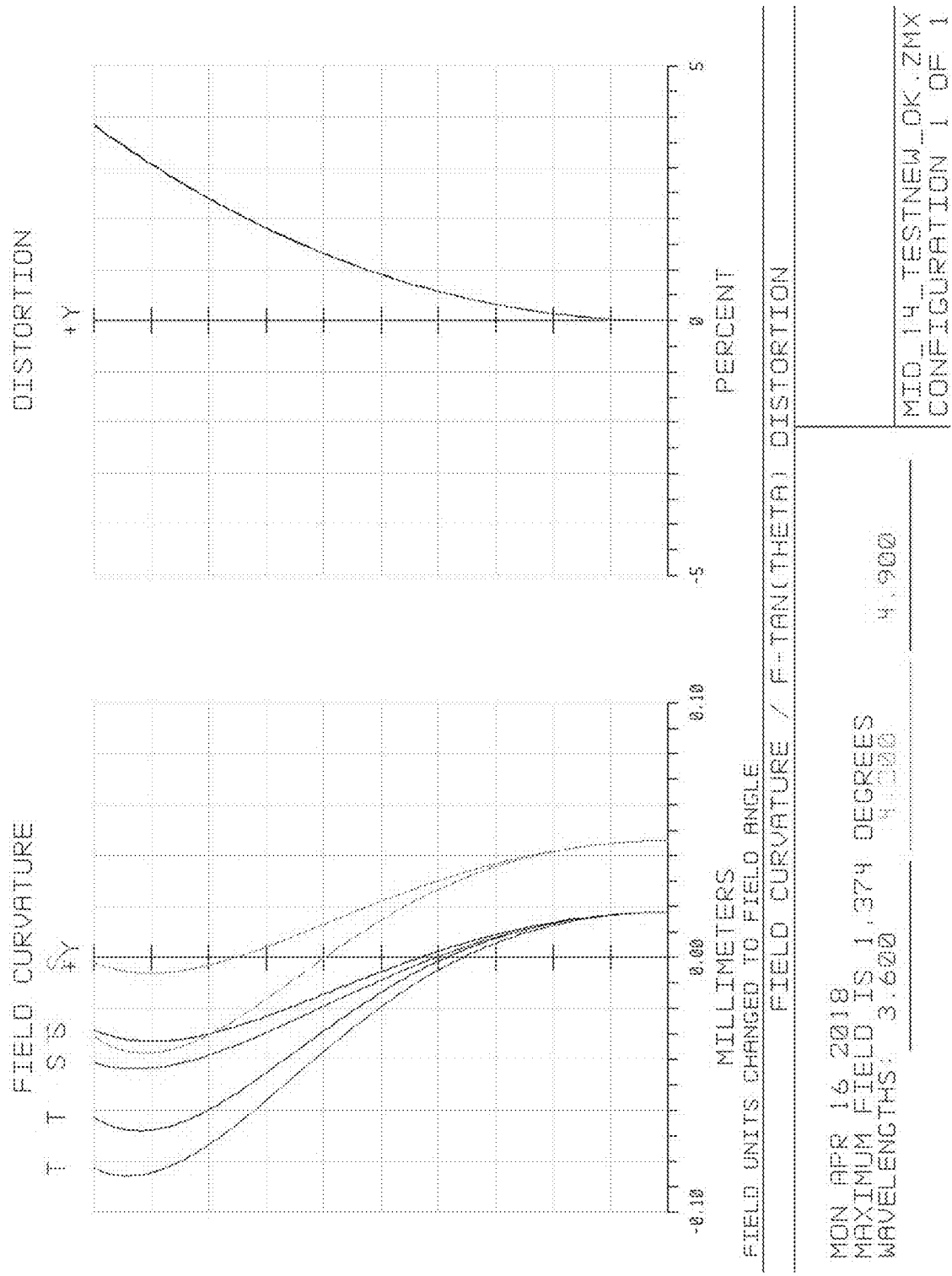
FIG. 4: Field curvature graph and image distortion graph at sensor plane.

Parameters such as radius of curvature, Conic coefficient and aspheric surficial coefficient of optical system are optimized to achieve the best quality image at the sensor plane. Graphs showing quality of optical system are described in FIG. 2, FIG. 3, and FIG. 4, where:

In FIG. 2: Module Transfer Function represents image quality at three fields 0; 0.7 and 1 approximately diffraction limit, which was shown by the fact that the lines are nearly overlapped. Also at the limited frequency Nyquist ($v_N=30$ mm$^{-1}$) transfer function is approximately 0.3;

In FIG. 3: Representation of Poisson spot size is over 1 pixel of different viewing fields. It is easy to see those light streaks have diffraction radius (RMS) less than 10 μm;

In FIG. 4: Representing the field curvature graph of three wavelengths at the Tangential and Sagittal planes. It is easy to determine that all graphs have the variation of field curvature less than 0.1 mm. In addition, the image distortion is less than 5%.

Accordingly, the proposed optical system ensures that the lens has a compact size, high quality image, and is capable of being used with cooling sensors having a cold shield.

The invention claimed is:

1. A catadioptric system for mid-wave thermal imaging equipment comprising two components:
   the first component comprises of two reflective mirrors, made of aluminum: mirror 1 and mirror 2, where a surface distortion of mirror 1 (1) is parabolic, a surface distortion of mirror 2 (2) is aspheric; mirror 1 and mirror 2 are arranged so that a reflective surface of mirror 1 and a reflective surface of mirror 2 are facing each other;

the second component comprises a relay consisting of three lenses: lens 1, lens 2, and lens 3 arranged after a medial image plane correspondingly, the second component is configured to reduce aberration to ensure receiving good quality image at a plane of a sensor, in which a total length of the optical system is 78.7 mm, the optical system operates in a spectral band 3-5 μm; a focal length is 250 mm; the optical system has a 1:4 aperture and viewing field of 1.6×2.2 degrees.

2. A catadioptric system for mid-wave thermal imaging equipment comprising two components:

the first component comprises of two reflective mirrors, made of aluminum: mirror 1 and mirror 2, where a surface distortion of mirror 1 (1) is parabolic, a surface distortion of mirror 2 (2) is aspheric; mirror 1 and mirror 2 are arranged so that a reflective surface of mirror 1 and a reflective surface of mirror 2 are facing each other;

the second component comprises a relay consisting of three lenses: lens 1, lens 2, and lens 3 arranged after a medial image plane correspondingly, the second component is configured to reduce aberration to ensure receiving good quality image at a plane of a sensor, Lens 1 has a meniscus shape made of a silicon (Si), covered with a first anti-reflective coating with a transmission greater than or equal to 99%, lens 1 contains one spherical surface and one aspheric surface, Lens 2 has a meniscus shape made of a magnesium fluoride ($MgF_2$), covered with a second anti-reflective coating with a transmission greater than or equal to 99%; lens 2 contains one concave spherical surface and one convex spherical surface;

Lens 3 has a meniscus shape made of a silicon (Si), covered with a third anti-reflective coating with a transmission greater than or equal to 99% lens 3 contains one spherical surface and one aspheric surface, in which a total length of the optical system is 78.7 mm, the optical system operates in a spectral band 3-5 μm; a focal length is 250 mm; the optical system has a 1:4 aperture and viewing field of 1.6×2.2 degrees.

* * * * *